(12) United States Patent
Dunn et al.

(10) Patent No.: US 6,955,137 B2
(45) Date of Patent: Oct. 18, 2005

(54) ARTICLE FOR GROOMING AN ANIMAL

(75) Inventors: Steven B. Dunn, Beverly Hills, CA (US); Bryce D. Fujii, Canoga Park, CA (US); Kevin C. Clark, Los Angeles, CA (US)

(73) Assignee: Munchkin, Inc., Van Nuys, CA (US)

( * ) Notice: Subject to any disclaimer, the term of this patent is extended or adjusted under 35 U.S.C. 154(b) by 381 days.

(21) Appl. No.: 10/407,492

(22) Filed: Apr. 4, 2003

(65) Prior Publication Data

US 2004/0194728 A1 Oct. 7, 2004

(51) Int. Cl.[7] .............................................. A01K 13/00
(52) U.S. Cl. ...................... 119/625; 119/617; 119/631
(58) Field of Search ................................ 119/625, 615, 119/617, 620, 631, 632, 633; 132/143, 151; D30/159; D28/23

(56) References Cited

U.S. PATENT DOCUMENTS

| | | | | | |
|---|---|---|---|---|---|
| 441,136 A | * | 11/1890 | Clements | .................... | 119/617 |
| 674,038 A | * | 5/1901 | Obey | ......................... | 119/617 |
| 1,695,765 A | * | 12/1928 | Howes | ....................... | 119/632 |
| 2,162,581 A | * | 6/1939 | Kapelman | ................... | 132/143 |
| 2,618,276 A | * | 11/1952 | Hamparson et al. | ........ | 132/143 |
| 3,308,500 A | | 3/1967 | Woodruff | ..................... | 119/615 |
| 5,339,840 A | * | 8/1994 | Koppel | ....................... | 132/151 |
| 5,655,482 A | * | 8/1997 | Lundquist | ................... | 119/625 |
| 6,543,388 B2 | * | 4/2003 | Willinger et al. | ........... | 119/833 |

* cited by examiner

Primary Examiner—Teri Pham Luu
Assistant Examiner—Elizabeth Shaw
(74) Attorney, Agent, or Firm—Knoble Yoshida & Dunleavy, LLC

(57) ABSTRACT

An article for grooming an animal includes an elongated handle and a plurality of dematting blades, each of which has a sharp edge for aiding in removing mats from the fur of an animal. The article further includes a comb having a plurality of combing tines for combing the fur of an animal. Most advantageously, selective positioning structure is provided for selectively positioning the article in one of a first grooming position that is characterized by the dematting blades being operatively positioned while said comb is retracted, and a second grooming position that is characterized by the comb being operatively positioned while the dematting blades are retracted.

29 Claims, 4 Drawing Sheets

ARTICLE FOR GROOMING AN ANIMAL

BACKGROUND OF THE INVENTION

1. Field of the Invention

This invention relates broadly to the field of animal care and grooming. More specifically, this invention relates to articles that are used to remove mats and loose dead undercoat from and otherwise care for the fur of an animal.

2. Description of the Related Technology

A wide selection of different articles and implements are commercially available for the purpose of grooming pets such as cats and dogs. Certain pets, such as long haired dogs, possess an undercoat of fur that is periodically shed. Grooming combs that are sometimes referred to as undercoat rakes are used to help dislodge and remove this undercoat when it is being shed. In general, the term rake refers to a comb that is positioned so that its tines are oriented so as to be substantially perpendicular to a longitudinal axis of the handle of the implement. An undercoat rake is so oriented, and typically includes a plurality of tines that are characterized by a broad cylindrical base portion and a tapered conical tip portion that is slightly rounded at its end. For purposes of this document, the term comb should be considered to be generic to both conventional combs and rakes.

One problem that often arises when animals, and in particular long-haired animals, are being groomed is that, as in humans, long hair sometimes becomes tangled and matted. Sometimes it is possible to remove these mats by diligent combing, but some mats stubbornly resist untangling and must be cut. Specialized articles known as dematting combs are available for this purpose. A dematting comb is characterized by a plurality of dematting blades, each of which has a sharp, sometimes serrated edge for cutting through matted hair or fur. Because of their sharp edges and aggressive shapes, dematting combs can result in injury to users, their animals, bystanders and property if not handled properly.

The need to purchase, store and maintain a number of different grooming articles tends to be expensive, space consuming and time-consuming. This is particularly the case with households that have a number of different pets and for kennels and other pet grooming facilities.

A need exists for an article for grooming an animal that reduces the need to purchase, store and maintain a number of different grooming articles. Moreover, a need exists for a dematting comb that presents minimal risk of property damage and/or injury.

SUMMARY OF THE INVENTION

Accordingly, it is an object of the invention to provide an article for grooming an animal that reduces the need to purchase, store and maintain a number of different grooming articles. It is further an object of the invention to provide a dematting comb that presents minimal risk of property damage and/or injury to a user or bystanders.

In order to achieve the above and other objects of the invention, an article for grooming an animal according to a first aspect of the invention includes a handle, a plurality of dematting blades, each of which has a sharp edge for aiding in removing mats from the fur of an animal, and retracting structure for retracting the dematting blades to a position wherein the sharp edges are safely removed from potential harmful contact with a user.

According to a second aspect of the invention, an article for grooming an animal includes a handle, a plurality of dematting blades, each of which has a sharp edge for aiding in removing mats from the fur of an animal; and a comb comprising a plurality of combing tines for aiding in combing the fur of an animal.

An article for grooming an animal according to a third aspect of the invention includes a handle, a plurality of dematting blades, each which has a sharp edge for aiding in removing mats from the fur of an animal, a comb comprising a plurality of combing tines for combing the fur of an animal, and selective positioning structure for selectively positioning the article in one of a first grooming position wherein the dematting blades are operatively positioned while the comb is retracted and a second grooming position wherein the comb is operatively positioned and the dematting blades are retracted.

A method of grooming an animal according to a fourth aspect of the invention steps of combing an animal by using a grooming article; repositioning the grooming article so as to present a plurality of dematting blades, each of the tines having a sharp edge for aiding in removing mats from the fur of an animal; and employing the dematting blades to remove at least one mat from the fur of an animal.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
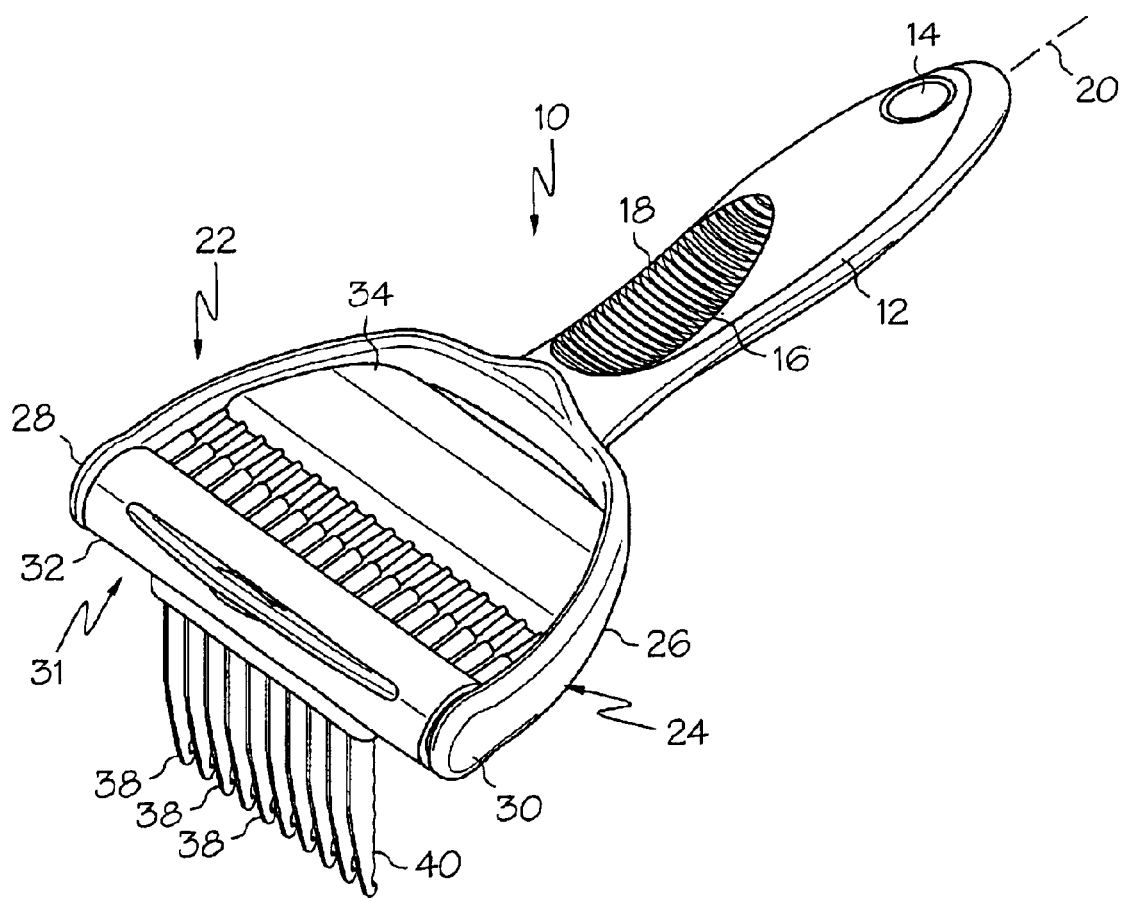
FIG. 1 is a perspective view of an article for grooming an animal that is constructed according to a preferred embodiment of the invention.

Referring now to the drawings, wherein like reference numerals designate corresponding structure throughout the views, and referring in particular to FIG. 1, an article 10 for grooming an animal that is constructed according to a preferred embodiment of the invention includes a handle 12 that has a hanging hole 14 defined therein and that further preferably has a textured gripping surface including a pair of recesses 18 for accommodating a user's thumb and fingers. Handle 12 is elongated along a longitudinal axis 20 and is connected to a combination grooming tool 22 that is adapted to be able to perform alternatively either as a dematting comb or as a comb for dressing or removing shed undercoat hair from an animal that is being groomed. Combination grooming tool 22 includes a housing 24 that defines a trunnion 26 having a first end 28 and a second end 30 between which is mounted for rotation a tool arbor 32 that, as will be described in greater detail below, functions as retracting structure for retracting potentially dangerous grooming tools to a position wherein the grooming tools are safely removed from potential harmful contact with a user. The rotatable tool arbor 32 further operates so as to permit selective positioning of more than one set of tools in either an operative position or a retracted position according to the grooming operation that is desired to be performed.

Figure 4:
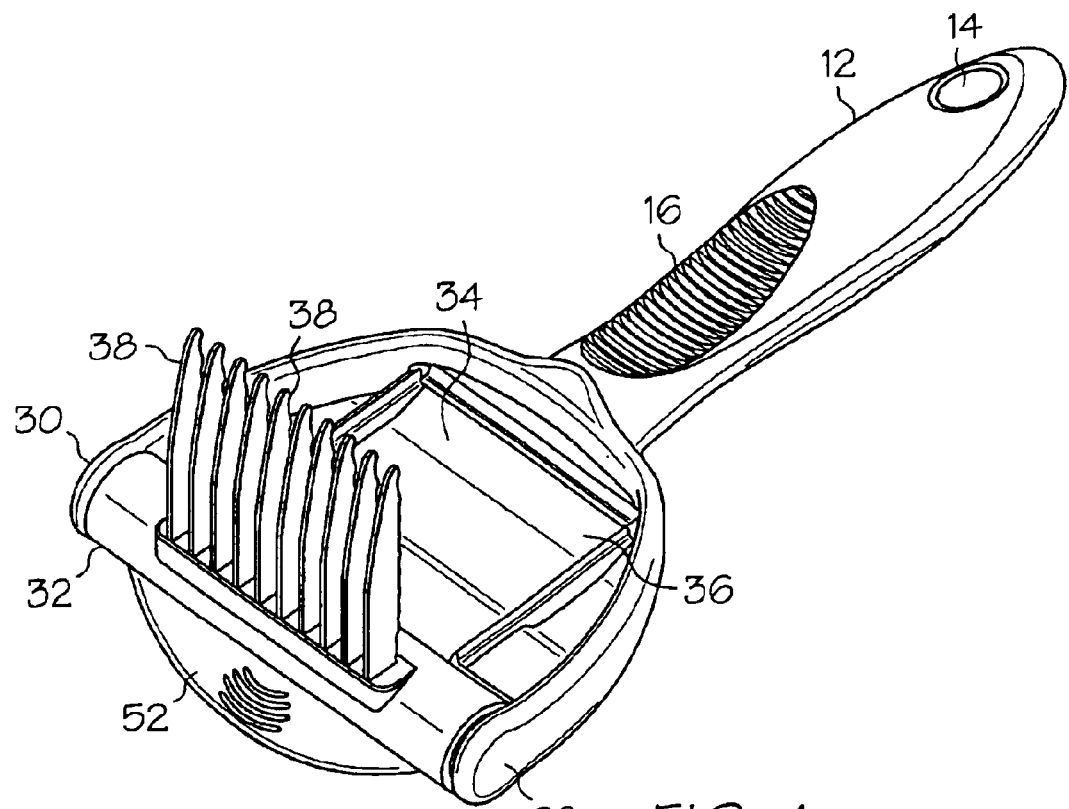
FIG. 4 is another perspective view of the article that is shown in FIG. 1

As may further be seen in FIG. 1, housing 24 further includes an interior bulkhead 34 that extends substantially within a plane that is substantially parallel to the longitudinal axis 20 of the handle 12. Referring briefly to FIG. 4, which shows the underside of the article 10 that is depicted in FIG. 1, it will be seen that a recessed compartment 36 is defined within the interior bulkhead 34. A plurality of dematting blades 38 are mounted to and extend radially outwardly from the tool arbor 32. Each of the dematting blades 38 includes a sharp, serrated edge 40 that is suitable for aiding in removing mats from the fur of an animal.

Article 10 further includes a comb 44 for dressing or removing shed undercoat hair from an animal that is being groomed. Comb 44 is preferably embodied as a plurality of tines 46 that extend as an array radially outwardly from the tool arbor 32. Preferably, each of the tines 46 includes a substantially cylindrical base portion 48 that is mounted to the tool arbor 32 and a tapered, conical tip portion 50 that is slightly rounded at its distal end. In the preferred embodiment of the invention, and as is best visualized by viewing FIG. 2, the array of tines 46 that define the comb 44 extend outwardly from the tool arbor 32 in orientation that is substantially perpendicular to the orientation of the array of dematting blades 38.

Figure 2:
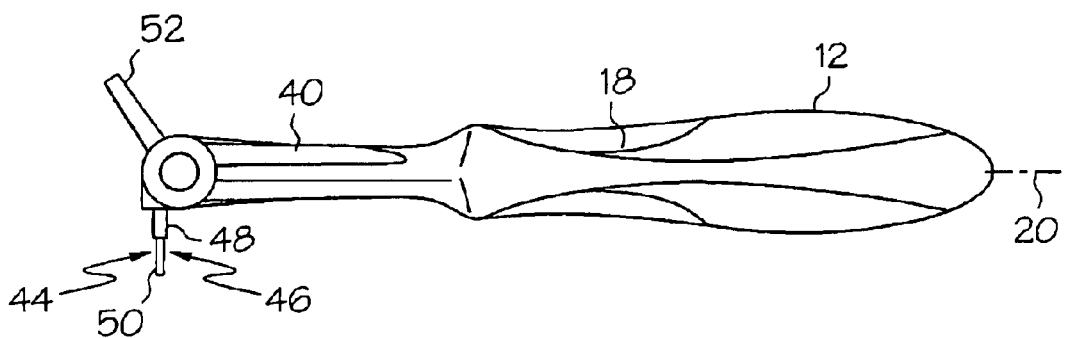
FIG. 2 is a side elevational view, partially in cross-section, of the article that is shown in FIG. 1.
Figure 3:
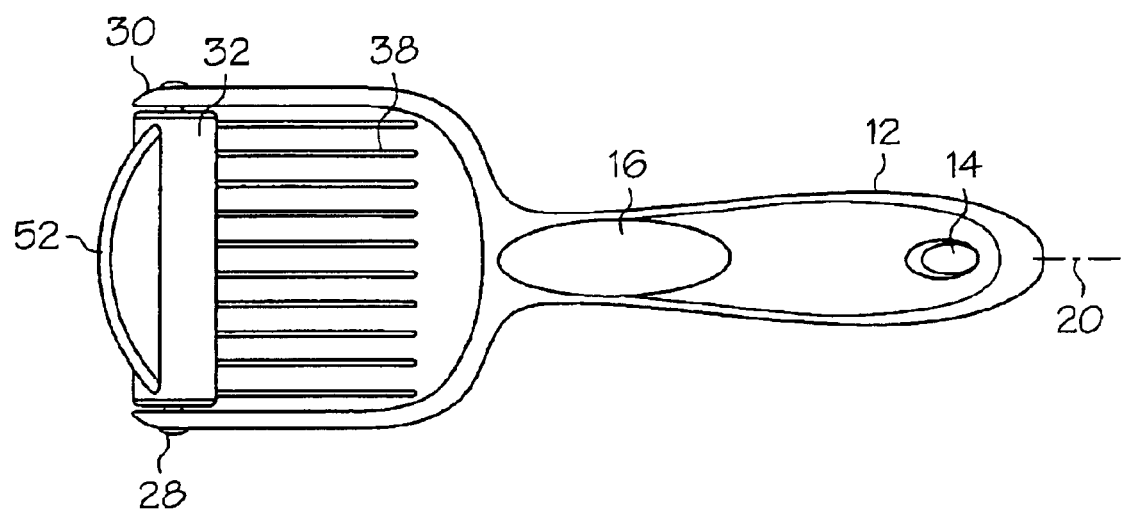
FIG. 3 is a top plan view of the article that is shown in FIG. 1.

According to one particularly advantageous feature of the invention, the selective positioning structure including the tool arbor 32 is preferably movable between a first grooming position, shown in FIGS. 1 and 4, wherein the dematting blades 38 are operatively positioned for grooming while the comb 44 is retracted, and a second grooming position, shown in FIGS. 2 and 3, wherein the dematting blades 38 are safely stored within the recessed compartment 36 of the housing 24 and the comb 44 is operatively positioned for grooming. In the first grooming position described above, the dematting blades 38 are oriented in a rake position so that they are substantially perpendicular to the longitudinal axis 20 of the handle 12. In the second grooming position, the comb 44 is oriented in a rake position so that it is substantially perpendicular to the longitudinal axis 20 of the handle 12 as well. The respective tools may conveniently and safely be moved between the first and second grooming positions by gripping and moving a control member 52 that extends radially from the tool arbor 32 and that preferably has a textured gripping surface defined thereon.

Figure 5:
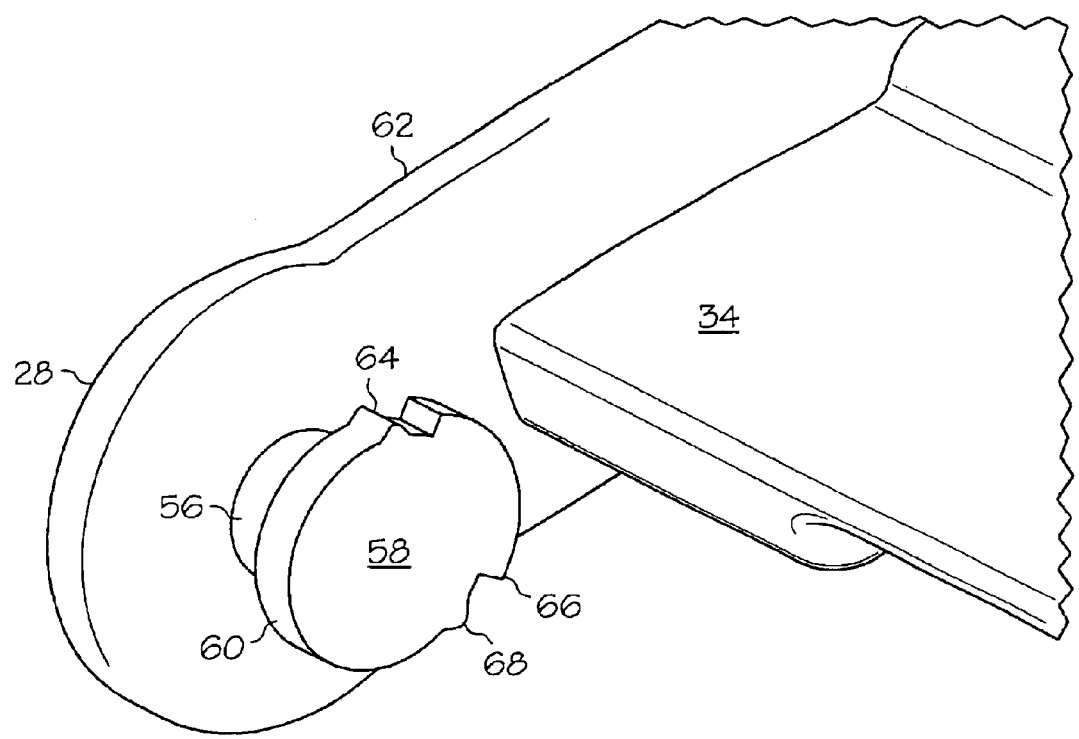
FIG. 5 is a fragmentary perspective view depicting one component of the article that is shown in FIG. 1.
Figure 6:
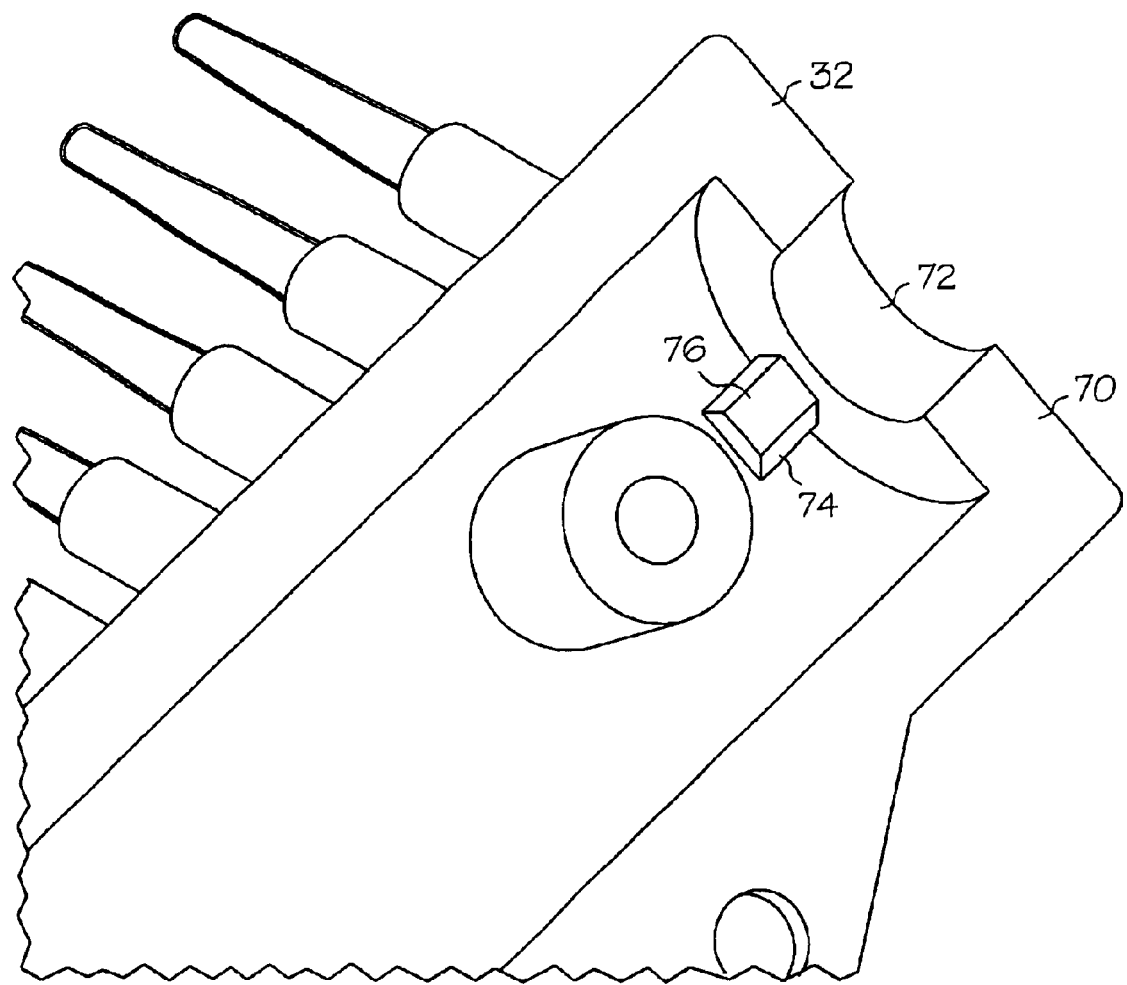
FIG. 6 is a fragmentary perspective view depicting another component of the article that is shown in FIG. 1.

Referring briefly to FIGS. 5 and 6, it will be seen that first end 28 of the trunnion 26 includes an integral inwardly extending axle 56 and a cam plate 58 that is unitary with the axle 56 and that includes a circumferential outer cam surface 60 having a first stop projection 62, a first locking projection 64 that is adjacent to the first stop projection 62, a second stop projection 66 and a second locking projection 68 that is adjacent to the second stop projection 66. Looking now to FIG. 6, it will be seen that arbor 32 includes a hub portion 70 having a smooth concave bearing surface 72 that is constructed in arranged to bear against the outer circumference of the axle 56 in order to support arbor 32 for smooth rotational travel with respect to the housing 24. Arbor 32 further includes a flexible cam follower 74 having a concave upper surface 76 that is constructed and arranged to bear against the cam surface 60 as the arbor 32 is rotated with respect to the trunnion 26. When the article 10 is positioned in the first grooming position that is depicted in FIG. 1, the flexible cam follower 74 will be positioned relative to cam surface 60 so that the concave upper surface 76 thereof is seated against the locking projection 64, with one edge of the cam follower 74 bearing against the side of the first stop projection 62. This secures arbor 32 in the position that a shown in FIG. 1 until the user exerts sufficient force on the control member 52 to unseat the upper surface 76 of the cam follower 74 from the locking projection 64 and causes the cam follower 74 to traverse the cam surface 60 in a counterclockwise direction as is viewed in FIG. 5. The user may continue to move the tool arbor 32 in this direction until the article 10 is in the second grooming position that is depicted in FIG. 2. In the second grooming position, the concave upper surface 76 of the flexible cam follower 74 will be seated against the second locking projection 68 while the edge of the cam follower 74 will be positioned against the side of the second stop projection 66, thereby precluding further rotation of arbor 32 in a counterclockwise direction as it is viewed in FIG. 2.

In operation, a pet owner or grooming professional will comb an animal using the comb 44. When a difficult tangle or mat is encountered, the user will grip the control member 52 in order to reposition the grooming article so as to present the plurality of dematting blades 38 in the first grooming position described above, as shown in FIG. 1. The user will then employ the dematting blades 38 to remove or cut through the mated hair or fur. After this has been accomplished, the user will return the article to the second grooming position, again presenting the comb 44 in the rake position. In this position, the serrated sharp edges 40 of the dematting blades 38 will be safely positioned against the bulkhead 34 within the recessed compartment 36 of the housing 24.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An article for grooming an animal, comprising:
   a handle;
   a plurality of dematting blades, each of said dematting blades having a sharp edge for aiding in removing mats from the fur of an animal; and
   retracting means for retracting said dematting blades to a position wherein said sharp edges are safely removed from potential harmful contact with a user.

2. An article for grooming an animal according to claim 1, wherein said retracting means is constructed and arranged to rotationally displace said dematting blades to a storage position.

3. An article for grooming an animal according to claim 2, wherein said handle is elongated along a longitudinal axis, and wherein said storage position is characterized by said dematting blades being positioned so as to be substantially parallel to said longitudinal axis.

4. An article for grooming an animal according to claim 2, wherein said retracting means comprises releasable locking means for locking said dematting blades in said storage position.

5. An article for grooming an animal according to claim 1, wherein said sharp edge of each of said dematting blades is serrated.

6. An article for grooming an animal according to claim 1, wherein said retracting means is further constructed and arranged to selectively present said dematting blades in an operative position, and wherein said operative position is a rake position wherein said dematting blades are positioned so as to be substantially perpendicular to a longitudinal axis of said handle.

7. An article for grooming an animal, comprising:

a handle;

a plurality of dematting blades, each of said dematting blades having a sharp edge for aiding in removing mats from the fur of an animal; and a comb comprising a plurality of combing tines for aiding in combing the fur of an animal.

8. An article for grooming an animal according to claim 7, further comprising retracting means for retracting said dematting blades to a position wherein said sharp edges are safely removed from potential harmful contact with a user.

9. An article for grooming an animal according to claim 8, wherein said retracting means is constructed and arranged to rotationally displace said dematting blades to a storage position.

10. An article for grooming an animal according to claim 9, wherein said handle is elongated along a longitudinal axis, and wherein said storage position is characterized by said dematting blades being positioned so as to be substantially parallel to said longitudinal axis.

11. An article for grooming an animal according to claim 10, wherein said retracting means comprises releasable locking means for locking said dematting blades in said storage position.

12. An article for grooming an animal according to claim 8, wherein said retracting means is further constructed and arranged to retract said comb to a storage position.

13. An article for grooming an animal according to claim 12, wherein said retracting means is configured so as to retract said comb to said storage position when said dematting blades are operatively positioned for grooming, and wherein said retracting means is further configured so as to retract said dematting blades to said storage position when said comb is operatively positioned for grooming.

14. An article for grooming an animal according to claim 12, wherein said storage position of said comb is characterized by tines of said comb being oriented so as to be substantially parallel with a longitudinal axis of said handle.

15. An article for grooming an animal according to claim 8, wherein said retracting means is further constructed and arranged to selectively present said comb in an operative grooming position wherein tines of said comb are oriented so as to be substantially perpendicular with a longitudinal axis of said handle.

16. An article for grooming an animal according to claim 8, wherein said retracting means further comprises a control member that is manipulable by a user to control positioning of said dematting blades.

17. An article for grooming an animal according to claim 16, wherein said control member further controls positioning of said comb.

18. An article for grooming an animal according to claim 7, wherein said sharp edge of each of said dematting blades is serrated.

19. An article for grooming an animal according to claim 7, wherein said retracting means is further constructed and arranged to selectively present said dematting blades in an operative position, and wherein said operative position is a rake position wherein said dematting blades are positioned so as to be substantially perpendicular to a longitudinal axis of said handle.

20. An article for grooming an animal, comprising:

a handle;

a plurality of dematting blades, each of said dematting blades having a sharp edge for aiding in removing mats from the fur of an animal;

a comb comprising a plurality of combing tines for combing the fur of an animal; and selective positioning means for selectively positioning said article in one of a first grooming position wherein said dematting blades are operatively positioned while said comb is retracted and a second grooming position wherein said comb is operatively positioned and said dematting blades are retracted.

21. An article for grooming an animal according to claim 20, wherein said handle is elongated along a longitudinal axis, and wherein said second grooming position is characterized by said dematting blades being positioned so as to be substantially parallel to said longitudinal axis.

22. An article for grooming an animal according to claim 20, wherein said sharp edge of each of said dematting blades is serrated.

23. An article for grooming an animal according to claim 20, wherein said selective positioning means comprises releasable locking means for releasably locking said article in either said first grooming position or said second grooming position.

24. An article for grooming an animal according to claim 20, wherein said first grooming position is characterized by said dematting blades being positioned in a rake position wherein said tines are oriented so as to be substantially perpendicular to a longitudinal axis of said handle.

25. An article for grooming an animal according to claim 20, wherein said second grooming position is characterized by said comb being positioned so that said combing tines are oriented so as to be substantially perpendicular to a longitudinal axis of said handle.

26. An article for grooming an animal according to claim 20, wherein said handle is elongated along a longitudinal axis, and wherein said first grooming position is characterized by said combing tines being positioned so as to be substantially parallel to said longitudinal axis.

27. An article for grooming an animal according to claim 20, wherein said selective positioning means further comprises a control member that is manipulable by a user to control positioning of said dematting blades.

28. An article for grooming an animal according to claim 27, wherein said control member further controls positioning of said comb.

29. A method of grooming an animal, comprising steps of:

(a) combing an animal by using a grooming article;

(b) repositioning the grooming article so as to present a plurality of dematting blades, each of said dematting blades having a sharp edge for aiding in removing mats from the fur of an animal; and (c) employing said dematting blades to remove at least one mat from the fur of an animal.

* * * * *